(12) United States Patent
MacKerron et al.

(10) Patent No.: US 7,255,928 B2
(45) Date of Patent: Aug. 14, 2007

(54) MULTILAYER POLYMERIC FILMS

(75) Inventors: Duncan Henry MacKerron, North Yorkshire (GB); Julia Elizabeth Friend, Yorkshire (GB)

(73) Assignee: DuPont Teijin Films U.S. Limited Partnership, Wilmington, DE (US)

( * ) Notice: Subject to any disclaimer, the term of this patent is extended or adjusted under 35 U.S.C. 154(b) by 499 days.

(21) Appl. No.: 10/476,733

(22) PCT Filed: Apr. 25, 2002

(86) PCT No.: PCT/GB02/01910

§ 371 (c)(1),
(2), (4) Date: Oct. 19, 2004

(87) PCT Pub. No.: WO02/087873

PCT Pub. Date: Nov. 7, 2002

(65) Prior Publication Data

US 2005/0058825 A1    Mar. 17, 2005

(30) Foreign Application Priority Data

May 2, 2001    (GB) ................... 0110799.4

(51) Int. Cl.
*B32B 27/06* (2006.01)
*B32B 27/18* (2006.01)
*B32B 27/20* (2006.01)
*B32B 27/36* (2006.01)

(52) U.S. Cl. .................. 428/480; 428/212; 428/304.4; 428/317.9; 428/318.4; 428/319.3; 428/319.7; 428/328

(58) Field of Classification Search ..................... None
See application file for complete search history.

(56) References Cited

U.S. PATENT DOCUMENTS

| 3,386,946 | A |   | 6/1968 | Willis |
| 4,698,261 | A | * | 10/1987 | Bothe et al. ................. 428/204 |
| 4,965,135 | A | * | 10/1990 | Im et al. ...................... 428/412 |
| 5,091,236 | A | * | 2/1992 | Keller et al. ................. 428/213 |
| 5,178,942 | A | * | 1/1993 | Frognet et al. ........... 428/317.9 |
| 5,326,625 | A | * | 7/1994 | Schuhmann et al. ........ 428/215 |
| 5,427,842 | A | * | 6/1995 | Bland et al. ................. 428/213 |
| 5,783,283 | A | * | 7/1998 | Klein et al. ................. 428/141 |
| 6,280,845 | B1 | * | 8/2001 | Kollaja et al. ........... 428/411.1 |

(Continued)

FOREIGN PATENT DOCUMENTS

DE    2412727    9/1975

(Continued)

OTHER PUBLICATIONS

J. Kerns et al. "Mechanical Behaviour of Polymer Microlayers", Macromol. Symp. 147, 15,(1999), pp. 15-24.

(Continued)

*Primary Examiner*—Vivian Chen
(74) *Attorney, Agent, or Firm*—RatnerPrestia

(57) ABSTRACT

The use of multilayer film structure comprising at least two unfilled layers of polymeric material substantially devoid of opacifying agent and at least two filled layers of polymeric material wherein said filled layers comprise at least 5% by weight of opacifying agent for providing improved tear-resistance in an opaque polymeric film, particularly a polyester film.

15 Claims, 9 Drawing Sheets

Figure 1:
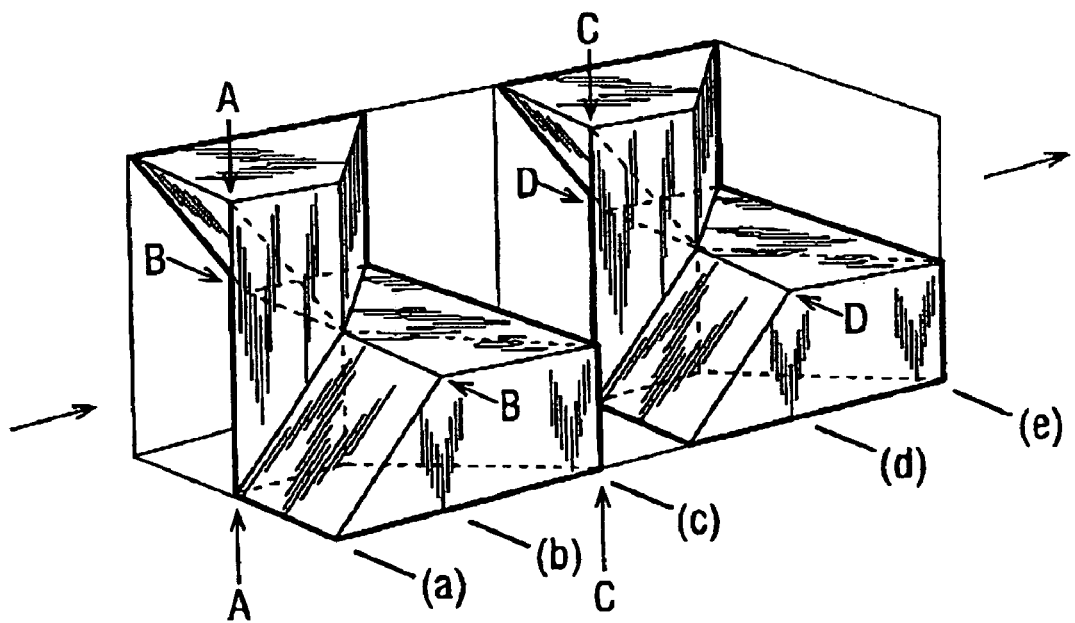
Figure 1:
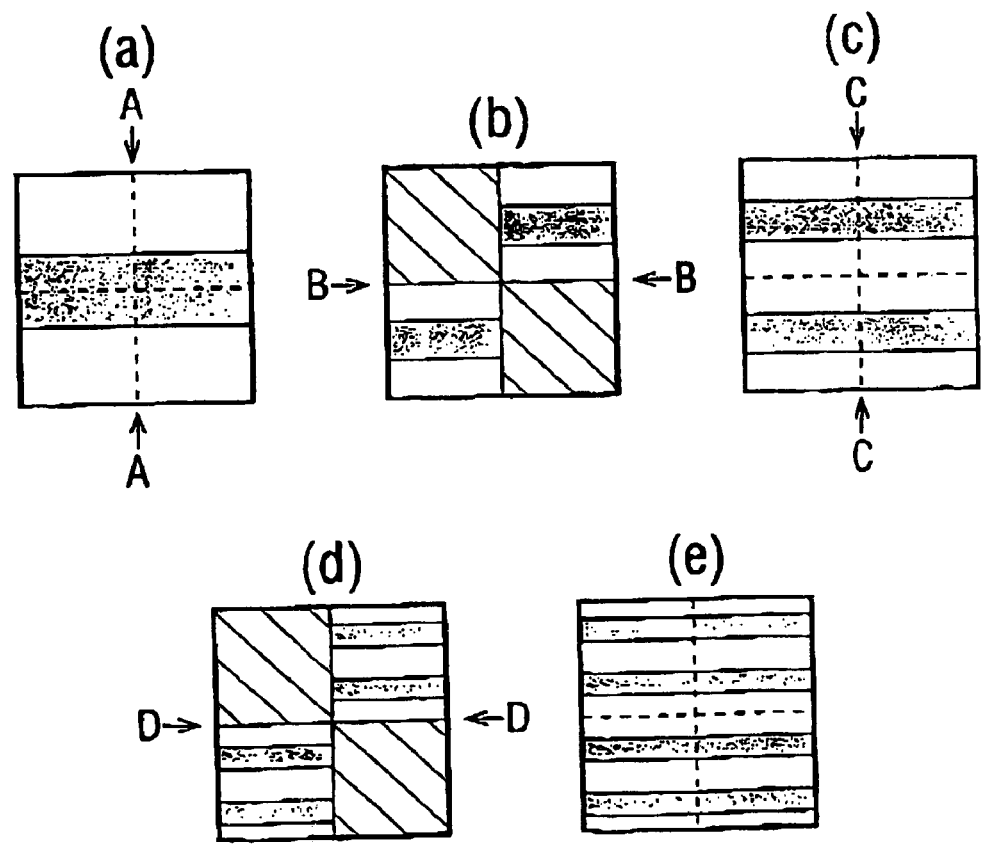

U.S. PATENT DOCUMENTS 6,579,601 B2 * 6/2003 Kollaja et al. ............ 428/212
6,749,123 B2 * 6/2004 Lasch et al. ............. 235/487

FOREIGN PATENT DOCUMENTS

| | | |
|---|---|---|
| EP | 0 497 483 A | 5/1992 |
| EP | 0 514 098 A2 | 11/1992 |
| EP | 0 592 284 A2 | 4/1994 |
| EP | 0 933 199 A1 | 8/1999 |
| WO | WO 97/37849 | 10/1997 |
| WO | WO 00/63014 | 10/2000 |

OTHER PUBLICATIONS

W.J. Schrenk and T. Alfrey, "Some Physical Properties of Multilayer films", Poly. Eng. Sci. 9, 393 (1969).

R-Y. Wu et al., "Tearing Resistance of Multilayer Plastic Films", Int. J. Fracture, 68, 141 (1994).

C. Yuksekkalayci et al., "Effects of Nucleating Agent and Processing Conditions on the Mechanical, Thermal, and Optical Propertis of Biaxially Oriented Polypropylene Films", Polymer Eng. Sci., 39, 7, 1216 (1999).

* cited by examiner

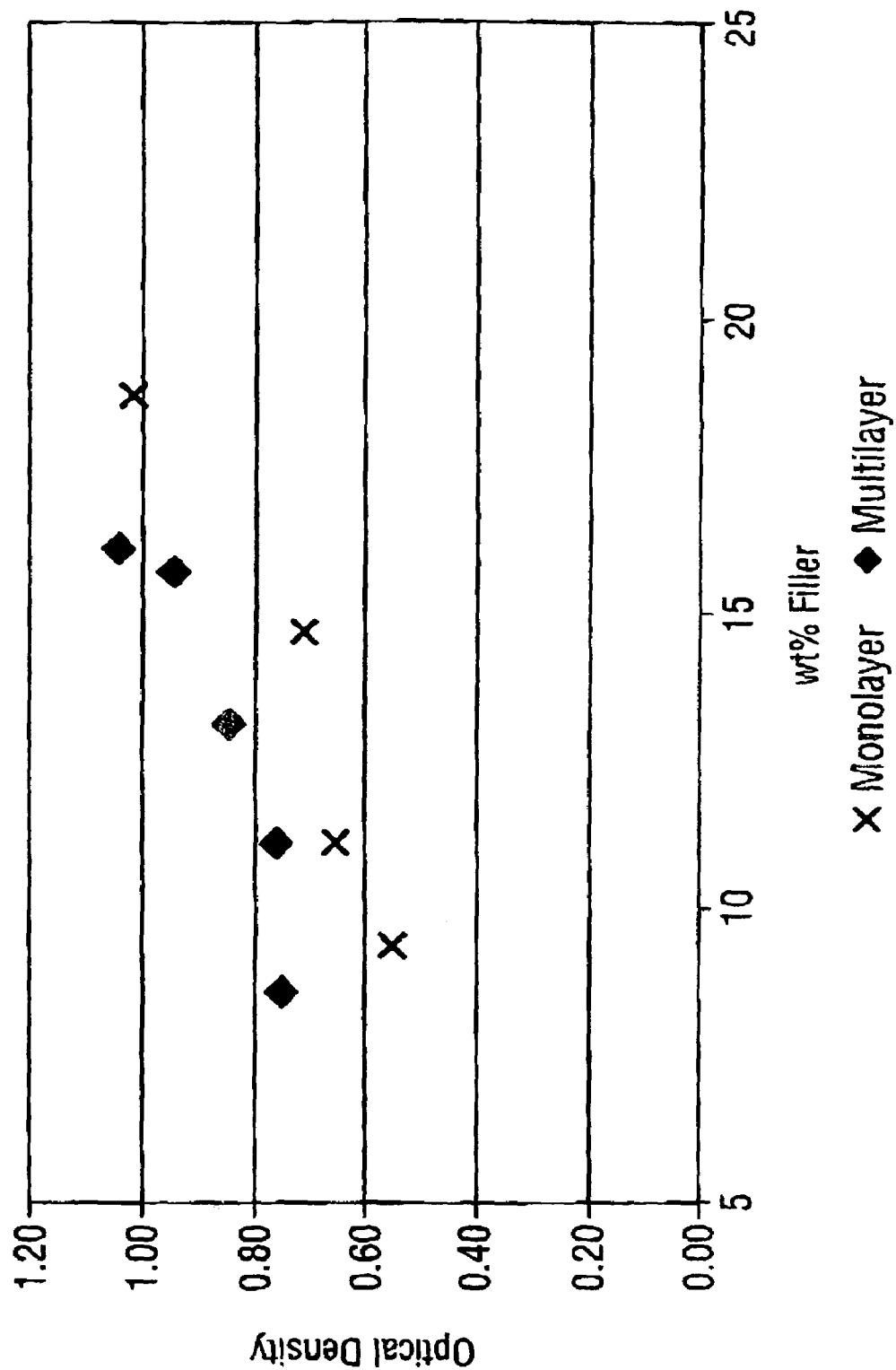

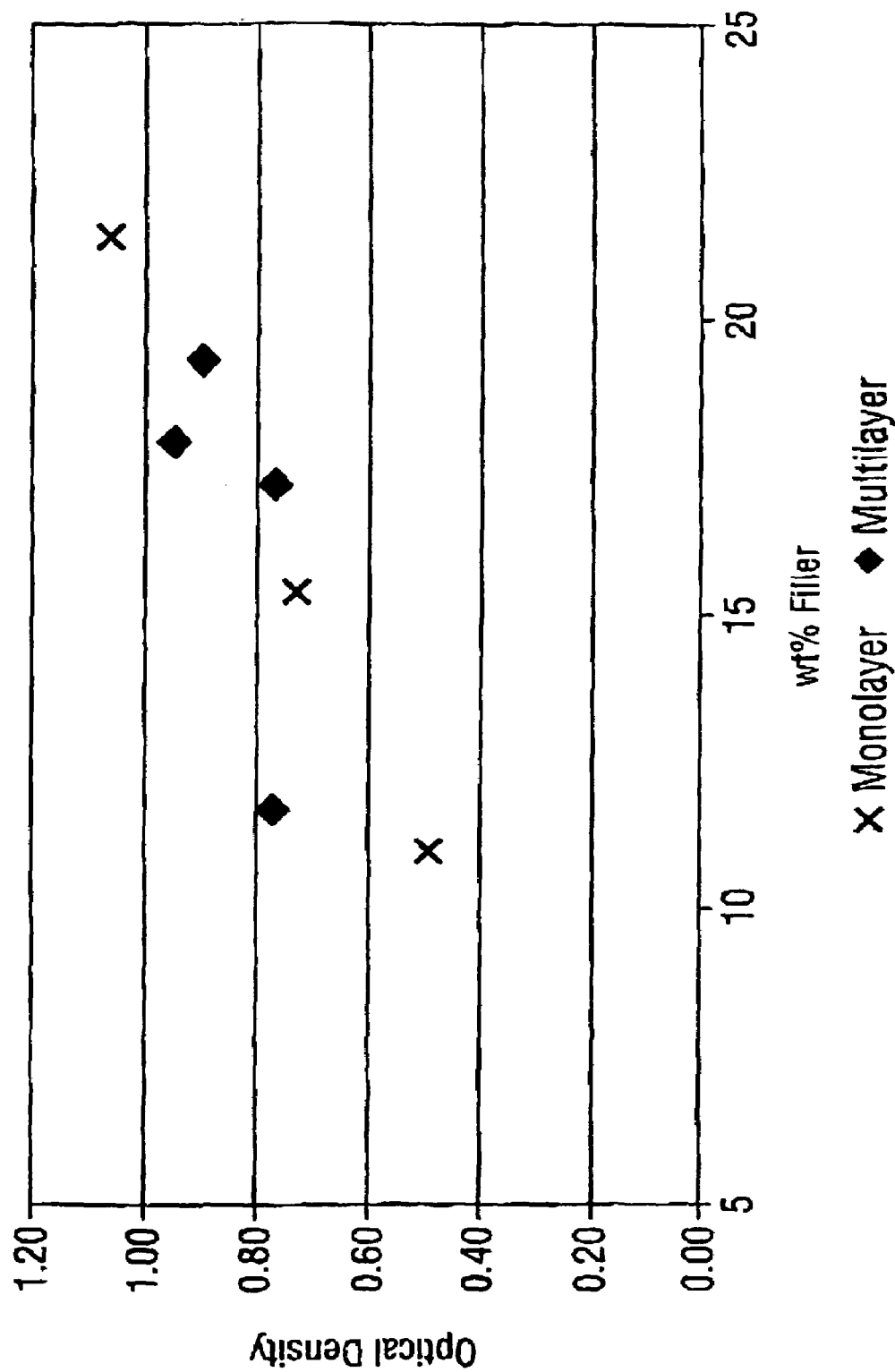

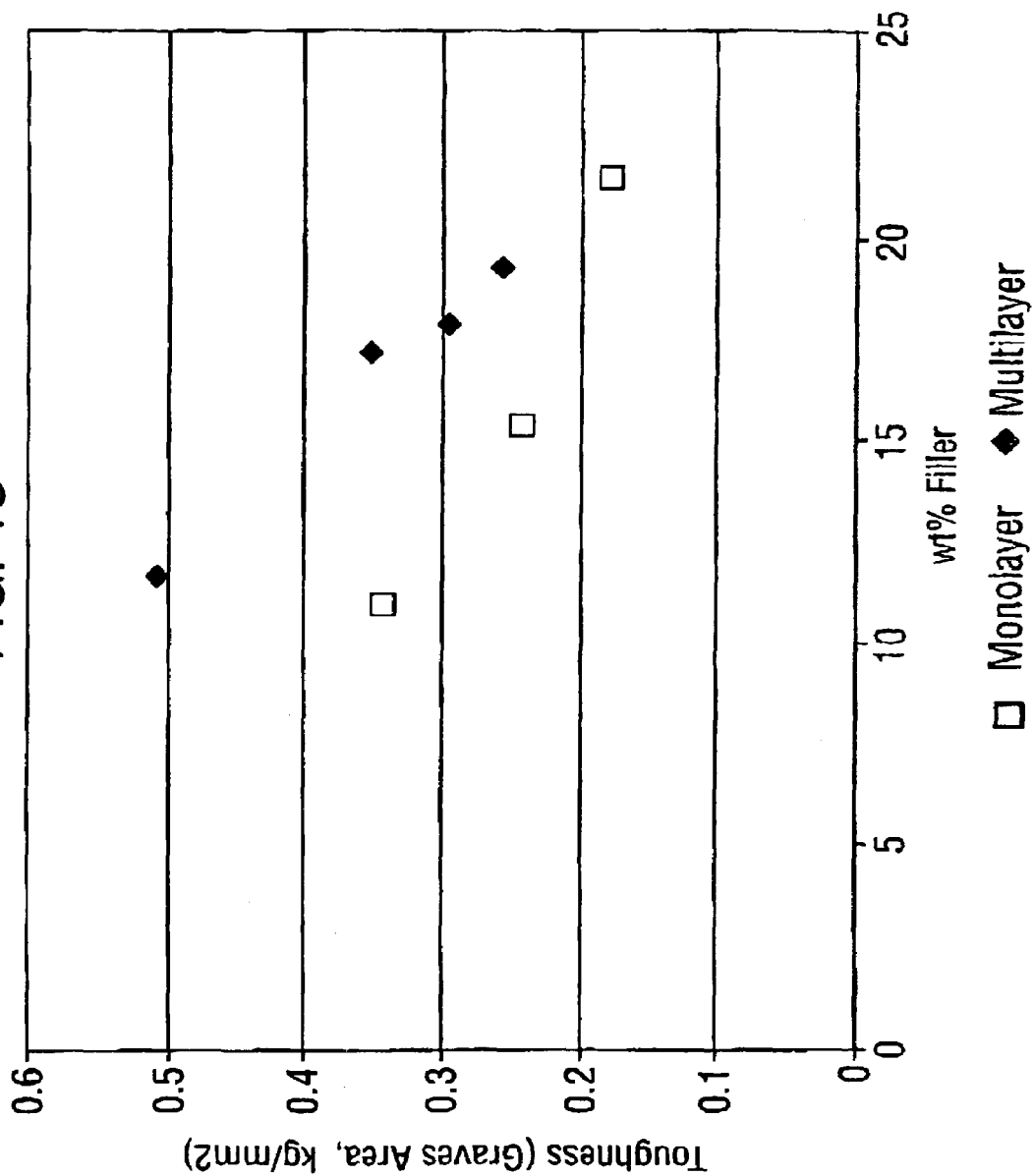

MULTILAYER POLYMERIC FILMS

The present invention relates to opaque multilayer polymeric films.

Opaque polymeric films are well known in the art and have a wide variety of uses, including use generally as a paper replacement (such as in films for graphics, displays, labels, cards (including identity cards, smart cards and credit cards) and imaging), as printing plate media, in packaging and in coil coating. Opaque films are generally prepared by the incorporation of fillers and pigments, especially white pigments, into a film-forming polymer.

The cost of manufacturing polmeric film is influenced by several factors, including the amount and price of die additive, the technical complexity of incorporating the additive into the film, and the efficiency of the manufacturing process. The cost of manufacture of opaque film is naturally greater than the cost of manufacture of unfilled film because of the cost of the additional components. Thus, although the incorporation of greater amounts of filler proportionally increases the opacity of a film, it is normal in conventional manufacturing processes for a compromise or balance between cost and opacity to be reached.

Besides the increased cost, there is a further disadvantage to the incorporation of fillers. Although being a convenient means for modulating the light transmission properties of a film, the incorporation of fillers can have a detrimental effect on the mechanical properties of the film. In particular, the incorporation of filler can adversely affect the tear-resistant properties of the film. A high tear-resistance is advantageous during the manufacturing process in order to improve economy, efficiency and productivity. A high tear-resistance is also advantageous in the general handling of the film and in the end use of the film.

In conventional manufacturing processes, a greater film thickness has been used in order to compensate for the adverse affect on mechanical properties caused by the use of filler. A greater film thickness, in relation to a transparent film having little or no filler is also required in order to incorporate sufficient filler to achieve the necessary opacity. A thicker film requires the use of greater amounts of film-forming polymer which, again, increases the cost of manufacture. A thinner gauge film which retains the requisite opacity and which exhibits good tear-resistance would therefore be economically desirable for price-sensitive markets.

Tear-resistant films are known in the art. EP-0592284 discloses a tear-resistant multilayer film comprising alternating layers of stiff and ductile polymeric materials which may be useful as a laminate for shatter-proofing a glazing member. U.S. Pat. No. 5,759,467 discloses a multilayer polyester film which comprises a plurality of alternating layers of terephthalic acid-based polyester and naphthalene dicarboxylic acid-based polyester. The film has increased tensile strength and is stated as being of use in, inter alia, magnetic media substrates.

The preparation of multilayer films may be achieved in a variety of ways. U.S. Pat. No. 3,647,612 discloses a process for the preparation of a multilayer film which involves providing two or more streams of thermoplastic material, arranging the two or more streams into a single stream having a plurality of generally parallel layers, mechanically manipulating the stream by dividing and recombining to provide an increased number of layers and then forming the steam into a thin sheet or film. The layers are composed of resinous material which is transparent to visible light, the multilayer film structure having an iridescent appearance. EP0426636 also discloses multilayer coextruded light-reflecting films comprising a plurality of generally parallel layers of transparent thermoplastic resinous material.

EP-0492894 discloses a method and apparatus for the production of a multilayer film by generating interfacial surfaces in a fluid mass. The method comprises the steps of dividing a first composite stream into at least two branch streams, repositioning the branch streams, expanding symmetrically along one axis, contracting symmetrically along another axis and recombining the branch streams into a second composite stream which comprises a greater number of discrete layers of polymeric material than the first composite stream, wherein the expansion and contraction steps are conducted either on the individual branch streams or on the second composite stream.

WO-98/06587 discloses a polyester film having an opaque, preferably black, core layer having an optical density greater than 2.0 and on both surfaces thereof a white outer layer for use as a photographic sheet or other imaging applications.

EP-A0933199 discloses an opaque multilayer film having at least one polyester layer containing more than 5 wt % of a pigment, and at least one polyester layer substantially devoid of pigment, wherein the ratio of the respective thicknesses of the layer(s) devoid of pigment to the pigmented layer(s) is at least 1. The film is stated as minimizing the overall pigment content while providing high opacity and good mechanical properties (modulus, tensile strength and force at 3% elongation, 5% elongation and elongation at break).

It is a general object of the invention to influence and improve the balance between the efficiency of manufacture of the film and the desired properties of the film. Thus, one object of the invention is to reduce manufacturing costs while maintaining or improving the desired properties of the film. A further object of the invention is to enhance the performance of the film without increasing manufacturing costs. In particular, it is an object of this invention to provide an opaque film which is economical to manufacture and which has improved tear-resistance. It is a further object of this invention to reduce the thickness of an opaque film while retaining the requisite opacity and also while retaining or improving tear-resistance. It is a further object of the invention to provide a film having an increased opacity for a given thickness whilst retaining or improving tear-resistance and therefore manufacturing efficiency.

According to the present invention there is provided the use of a multilayer substrate or structure comprising at least two unfilled layers of polymeric material substantially devoid of opacifying agent and at least two filled layers of polymeric material wherein said filled layers comprise at least 5% by weight of opacifying agent for providing improved tear-resistance in an opaque highly, filled polymeric film.

According to a further aspect of the present invention, there is provided an opaque multilayer film comprising at least two unfilled layers of polyester material substantially devoid of opacifying agent and at least two filled layers of polymeric material wherein said filled layers comprise at least 5% by weight of opacifying agent.

For brevity, the term "an unfilled layer" will be used herein to refer to a layer of polymeric material substantially devoid of opacifying agent (or filler) and the term "a filled layer" will be used herein to refer to a layer of polymeric material comprising at least 5% by weight of an opacifying agent.

As used herein, a reference to a % weight of filler is unless otherwise specified a reference to the weight of filler relative to the total weight of the film or relative to the total weight of a given layer (i.e. the weight of the film- or layer-forming polymeric material plus filler).

For a given opacity, a multilayer film as described herein allows a reduction in the amount of filler in the film as a whole relative to a film which does not have the multilayer structure. Thus, for a given opacity, a multilayer film as described herein allows a reduction in the amount of filler relative to a filled mono-layer film. In general, different fillers produce different degrees of opacity for a given concentration of filler.

The film described herein exhibits good opacity and unexpectedly improved tear-resistance. The film allows the use of less filler while retaining the opacity of conventional opaque films and is more economical to produce. The unexpected benefit in tear-resistance means that:

(i) for a given opacity and tear-resistance, thinner films can be produced; or
(ii) for a given opacity and film thickness, a film having an improved tear-resistance can be produced, with an increased efficiency of manufacture; or
(iii) for a given thickness and tear-resistance, the opacity of a film can be increased, i.e. the amount of filler in the film and therefore the opacity can be increased without decreasing the tear-resistance of the film or adversely affecting the efficiency of manufacture.

In one embodiment, a multilayer film preferably composes, in the film as a whole, filler in an amount less than about 90%, preferably less than about 80%, preferably less than about 70% and preferably less than about 60% of the amount of a filler in a monolayer film of equal opacity. As noted above, such a film allows film thickness to be reduced for a given opacity without adversely affecting tear-resistance and manufacturing efficiency. In this embodiment, the overall amount of filler in the multilayer film is preferably less than about 18% filler by weight of the film preferably less than about 16%, preferably less than about 12%, preferably less than about 8%, and preferably less than about 4%. As noted above, different fillers provide different degrees of opacity. In this embodiment, and where the filler is barium sulphate, the overall amount of filler in the film is less than about 18%, preferably less than about 16%, and preferably less than 12% by weight of the film. Where the filler is, for example, titanium dioxide or polypropylene the overall amount of filler is less than about 16%, preferably less than 12%, preferably less than 8%, and preferably less than 4%.

In an alternative embodiment, a multilayer film comprises, in the film as a whole, filler in an amount of at least 110%, preferably at least 120%, preferably at least 130%, and preferably at least 140% of the amount of filler in a monolayer film of equal tear-resistance. As noted above, such a film allows opacity to be increased for a given film thickness without adversely affecting the tear-resistance and manufacturing efficiency. In this embodiment, the overall amount of filler in the multilayer film may be more than about 15%, preferably more than about 20%, preferably more than about 22% and preferably more than about 25% by weight of the film. For barium sulphate filler, for example, the overall amount of filler in the film may be greater than 22% and preferably 25% or above.

The opacifying agent is present in the filled layer at a level of at least 5%, preferably at least 10%, and more preferably at least 15%, by weight of the polymeric material of the filled layer. Preferably, the amount of opacifying agent in the filled layer is no more than 30%, and preferably no more than 25%, by weight of the polymeric material of the filled layer.

The tear properties of the films described herein are characterised using two parameters, namely the "maximum load" and the "tear toughness".

The maximum load is a measure of the force required to initiate tearing of the film, i.e. the load at the onset of tearing, and is measured in accordance with ASTM D1004-94A (Graves Tear Test). This parameter is referred to in ASTM D1004-94A as the initial tear-resistance, and is expressed in Newtons or kilograms-force. The maximum load (referred to as initial tear-resistance in the Graves Tear Test) generally increases with increasing film thickness. Thus, for the purpose of a fair comparison it is important either that film with similar thickness is tested, or that the quantitative relationship between thickness and maximum load is first determined for the film type under consideration. In this work, data have been collected which shows that maximum load changes closely in proportion to thickness and that the Graves Tear Test can be used reliably to compare filled polyester film whose thickness lies in the range 50 to 125 µm. Thus, the measurement of maximum load is reported herein after normalisation to a reference thickness of 80 µm. Preferably, the film exhibits a maximum load of at least 3.0 kgf, preferably at least 3.5 kgf and more preferably at least 4.0 kgf at a film thickness of 80 µm.

The tear toughness is measured as the Graves Area of the film, as described in EP-A-0592284. The Graves Area is obtained by mathematically integrating the area beneath the curve in a graphical plot of the stress versus the strain for a film subjected to the Graves Tear Test (ASTM D1004-94A), i.e. during a test in which a film sample specifically shaped for a Graves Tear Test is clamped between opposed jaws that are moved apart at a constant rate to concentrate the tearing stresses in a small area. The stress is defined as the recorded load divided by the initial cross-sectional area of the film opposite the notch feature of the test sample. The strain is defined as the ratio of the change in the distance between the jaws ($\Delta l$) that occurs during the test, to the initial separation of the jaws (l), i.e. strain is $\Delta l/l$.

Thus, tear toughness may be regarded as a measure of the total energy required to cause the film to fail, i.e. the ability of the film to absorb energy before failure. It will be understood that film with a relatively large tear toughness value will require a larger amount of total energy to cause failure, compared to film with a relatively small tear toughness value. The tear toughness may vary depending on whether the test is conducted in the machine or the transverse direction of the film.

Preferably, the multilayer films described herein demonstrate a tear toughness in one or both dimensions of the film equal to at least 0.3 k/mm$^2$, preferably at least 0.6 kg/mm$^2$, and more preferably at least 0.9 kg/mm$^2$.

Preferably the opaque multilayer film comprises at least 5 layers, preferably at least 6 layers and preferably 7 or more layers. The total number of layers in the film is generally limited by the desired film thickness and by the ease of manufacture. Typically, a film would have less than 100 layers. In one embodiment, the film has less than 50 layers. The number of layers may be adjusted according to the target thickness of the film and the target opacity. For a given film thickness, the number of layers will depend on, for instance, the thickness of individual layers and the particle size of the filler. For instance, for a 20 µm thick film comprising a filler of an average particle size of 1 µm in diameter, and an individual layer thickness of 0.5 µm, the number of layers should not exceed about 40.

Preferably the film comprises alternate filled layers and unfilled layers, i.e. a filled layer is arranged between two unfilled layers and an unfilled layer is arranged between two filled layers.

In a preferred embodiment, the two outermost layers of the film are the same type of layer, preferably a filled layer. Where the outer layers are of the same type, preferably there is an odd number of layers in the film so that each unfilled layer is adjacent to a filled layer throughout the film.

The film may have, for example, a multi-layer structure $(BA)_n$, $(BA)_nB$ or $(AB)_nA$ wherein A designates an unfilled layer; B designates a filled layer and n is an integer of at least 2, preferably at least 3, and preferably at least 4. Preferably, the film has a structure $(BA)_nB$, preferably wherein n is at least 3, and preferably at least 4.

The thickness of each layer and the total thickness of the film may be varied over wide limits within the scope of the invention. The practical thickness of the film is limited only by the handling characteristics desired. The lower useful practical limit is that at which the film becomes too flimsy to be readily handled or is no longer sufficiently tear resistant while the upper useful limit is that at which the film becomes overly rigid and too difficult to process.

The total thickness of the multilayer film described herein is preferably in the range from about 5 µm to about 350 µm, preferably from about 5 µm to about 200 µm. In one embodiment, the film thickness is preferably from about 5 µm to about 100 µm, more preferably from about 5 µm to about 50 µm, more preferably from about 5 µm to about 20 µm, and particularly from about 12 µm to about 20 µm. In an alternative embodiment, the film thickness is in the range from about 50 µm to about 125 µm. The thickness of the individual layers may also vary over a wide range, it being understood that as the number of layers increases at a constant or decreasing film thickness, the thickness of each layer declines. An individual filled layer typically has an average thickness of at least about 0.1 µm, and in one embodiment at least about 0.5 µm. Although the thickness of each layer may be the same, it is prefer that the filled layers are thicker than the unfilled layers, i.e. the ratio of thickness of a filled layer to the thickness of an unfilled layer is greater than 1:1. The ratio of the thickness of a filled layer to the thickness of an unfilled layer is suitably in the range from about 99:1 to about 0.05:1, preferably about 50:1 to about 0.05:1 and is preferably about 10:1 to about 1:1.

Each of the two types of layer, i.e. the unfilled and filled layers, has a tensile modulus which is within ±25%, preferably ±15%, more preferably ±5% of the tensile modulus of the other type of layer. In one embodiment, the two types of layer have substantially the same tensile moduli. Preferably the polymeric material of each layer has a tensile modulus of greater than 1380 MPa, preferably greater than 2000 MPa, preferably greater than 2070 MPa, preferably greater than 2760 MPa, and preferably greater than 3000 MPa.

The respective layers of the multilayer film may be formed from any film-forming material, particularly a polyester such as a synthetic linear polyester which may be obtained by condensing one or more dicarboxylic acids or their lower alkyl (up to 6 carbon atoms) diesters, eg terephthalic acid, isophthalic acid, phthalic acid, 2,5-, 2,6- or 2,7-naphthalenedicarboxylic acid; succinic acid, sebacic acid, adipic acid, azelaic acid, 4,4'-diphenyldicarboxylic acid, hexahydro-terephthalic acid or 1,2-bis-p-carboxyphenoxyethane (optionally with a monocarboxylic acid, such as pivalic acid) with one or more glycols, particularly an aliphatic or cycloaliphatic glycol, eg ethylene glycol, 1,3-propanediol, 1,4-butanediol, neopentyl glycol and 1,4-cyclohexanedimethanol. An aliphatic glycol is preferred. Polyethylene terephthalate or polyethylene naphthalate is the preferred polyester. Polyethylene terephthalate is particularly preferred.

In a preferred embodiment of the invention each type of layer of the multilayer film comprises the same material, preferably the same polyester. Preferably, the materials comprising the various layers are processable at the same temperature and have similar melt viscosities so as to avoid degrading a lower melting material. Accordingly, residence time and processing temperatures may have to be adjusted depending on the characteristics of the materials of each layer. It is also preferred that the layers comprise crystalline and/or semi-crystalline polyester material.

Formation of a multilayer film may be effected by any of the techniques known in the art. Conveniently, however, formation of a composite film is effected by coextrusion, either by simultaneous coextrusion of the respective film-forming layers through independent orifices of a multi-orifice die, and thereafter uniting the still molten layers, or, preferably, by single-channel coextrusion in which molten streams of the materials of the respective film-forming layers are first united within a channel leading to a die manifold, and thereafter extruded together from the die orifice under conditions of streamline flow without intermixing.

One such technique is disclosed in U.S. Pat. No. 3,565,985 (Schrenk et al.). In making the multilayer films, melt coextrusion by either the multi-manifold die or the feedblock method in which individual layers meet under laminar flow conditions to provide an integral multilayer film may be used. More specifically, separate streams of the materials of each layer in a flowable state are each split into a predetermined number of smaller sub-streams. These smaller streams are then combined in a predetermined pattern of layers to form an array of layers of these materials in a flowable state. Each layer is in intimate contact with adjacent layers in the array. This array generally comprises a tall stack of layers which is then compressed to reduce its height. In the multi-manifold die approach the film width remains constant during compression of the stack while the width is expanded in the feedblock approach. In either case, a comparatively thin, wide film results. Layer multipliers in which the resulting film is split into a plurality of individual subfilms which are then stacked one upon another to increase the number of layers in the ultimate film may also be used.

In one embodiment, the preparation of the multilayer film is effected according to the procedure described in U.S. Pat. No. 3,051,453 (re-issued as Re. Pat. No. 28,072) and illustrated in FIG. 1. The patent reports a process in which a coextruded melt flow comprising three discrete layers from two polymers (BAB) is split and subsequently recombined as a stack of five distinct layers (BABAB). This procedure can be repeated to yield a single melt flow comprising higher orders of layer structure, which may then be extruded into a formed shape such as a film. Indeed, recent reports confirm that a symmetric multilayer structure can be produced after as many as 7 layer multiplying units are incorporated in series into a coextruded melt process (Nazarenko et al, SPE Inc., Tech. Papers Vol 42, p1587, 1996).

The films described in the Examples hereinafter were prepared by following the procedure described in U.S. Pat. No. 3,051,453. The coextruded melt comprising three layers (BAB) was processed through either two or three layer multiplier units. The resulting multilayer melt was then directed through a slot die to be cast and quenched as a thin film.

In a further embodiment, the preparation of the multilayer films may be effected using layer multipliers on a composite stream comprising discrete layers of coextruded polymeric material, as described below and in FIG. 2, wherein the z-axis is the direction of flow of a first composite stream, the x-axis extends transversely of the first composite stream along a transverse dimension of the layer interface, and the y-axis extends perpendicularly away from the layer interface in the direction of the thickness of the layers of the first composite stream:

(1) expansion in the x-direction of a first composite stream comprising co-extruded, discrete layers of polymeric material, wherein the interface between the layers lies in the x-z plane;
(2) division of the first composite stream along the x-axis into multiple branch streams;
(3) re-orientation of the branch streams as they flow along the x-axis so that they are stacked along the y-axis;
(4) recombination of the branch streams to form a second composite stream; and
(5) contraction of the second composite stream along the y axis.

The layer-multiplication apparatus is positioned after the different polymers have been combined in a co-extrusion block. After the melt leaves the layer multiplier, it passes through a die and is then manufactured into a film with the desired crystallinity. The process may be performed using any number of extruders to provide a first composite stream, as required. The first composite stream may also undergo layer multiplication using more than one layer multiplier, arranged in series or in parallel.

Other manufacturing techniques such as lamination, coating or extrusion coating may be used in assembling multi-layer films. For example, in lamination, a plurality of preformed layers having the requisite differences in optical properties are brought together under temperature and/or pressure (e.g. using heated laminating rollers or a heated press) to adhere adjacent layers to each other. The films may also be manufactured by successive casting of one or more layer(s) onto one or more preformed layer(s). Extrusion coating may be preferred over the melt coextrusion process described above where it is desirable to pretreat selected layers of the multilayer film or where the materials are not readily coextrudable. In extrusion coating, a first layer is extruded onto either a cast web, a monoaxially oriented film or a biaxially oriented film and subsequent layers are sequentially coated onto the previously provided layers. Exemplary of this method is U.S. Pat. No. 3,741,253.

In the manufacture of the multilayer films, any combination of the above process techniques may be adopted. For example, the use of more than two extruders and the lamination of two or more co-extruded films may be used.

The layers of each type in the multilayer film may be uniaxially oriented, but are preferably biaxially oriented by drawing in two mutually perpendicular directions in the plane of the film to achieve a satisfactory combination of mechanical and physical properties. Orientation may be effected by any process known in the art for producing an oriented film, for example a tabular or flat film process.

In a tubular process, simultaneous biaxial orientation may be effected by extruding a thermoplastics polyester tube which is subsequently quenched, reheated and then expanded by internal gas pressure to induce transverse orientation, and withdrawn at a rate which will induce longitudinal orientation.

In the preferred flat film process, the layer-forming polymer is extruded through a slot die and rapidly quenched upon a chilled casting drum to ensure that the polymer is quenched to the amorphous state. Orientation is then effected by stretching the quenched extrudate in at least one direction at a temperature above the glass transition temperature of the polymer. Sequential orientation may be effected by stretching a flat, quenched extrudate firstly in one direction, usually the longitudinal direction, i.e. the forward direction through the film stretching machine, and then in the transverse direction. Forward stretching of the extrudate is conveniently effected over a set of rotating rolls or between two pairs of nip rolls, transverse stretching then being effected in a stenter apparatus. Stretching is effected to an extent determined by the nature of the polyester, for example polyethylene terephthalate is usually stretched so that the dimension of the oriented film is from 2 to 5, more preferably 2.5 to 4.5 times its original dimension in the or each direction of stretching. Greater draw ratios (for example, up to about 8 times) may be used if orientation in only one direction is required. It is not necessary to stretch equally in the machine and transverse directions although this is preferred if balanced properties are desired.

A stretched film may be, and preferably is, dimensionally stabilised by heat-setting under dimensional restraint at a temperature above the glass transition temperature of the polyester but below the melting temperature thereof, to induce crystallisation of the polyester. In applications where film shrinkage is not of significant concern, the film may be heat set at relatively low temperatures or not at all. On the other hand, as the temperature at which the film is heat set is increased, the tear resistance of the film may change. Thus, the actual heat set temperature and time will vary depending on the composition of the film and its intended application but should not be selected so as to substantially degrade the tear resistant properties of the film. Within these constraints, a heat at temperature of about 135° to 235° C., preferably about 180 to 235° C., is generally desirable.

The opaque multi-layer film of the present invention is highly filled, preferably exhibiting a Transmission Optical Density (TOD) of at least 0.25, more preferably at least 0.5, particularly at least 0.75, and ideally at least 1.0. In one embodiment the TOD is in the range from 0.1 to 3.0, more preferably 0.25 to 2.5, more preferably from 0.5 to 2.0, and particularly 0.75 to 1.25. The film is rendered opaque by incorporation into the polymer blend of the filled layer of an effective amount of an opacifying agent. Suitable opacifying agents include an incompatible resin filler, a particulate inorganic filler or a mixture of two or more such fillers, as described hereinafter.

The surface of the opaque film preferably exhibits a whiteness index, measured as herein described, in the range from 60 to 120, more preferably 80 to 110, particularly 90 to 105, and especially 95 to 100 units.

Particularly improved aesthetic appearance occurs when the external surface of a film is matt, preferably exhibiting a 60° gloss value, measured as herein described, of less than 60%, more preferably in the range from 5% to 55%, particularly 20% to 50%, and especially 35% to 45%.

By an "incompatible resin" is meant a resin which either does not melt, or which is substantially immiscible with the polymer, at the highest temperature encountered during extrusion and fabrication of the film. The presence of an incompatible resin usually results in a voided layer, by which is meant that the layer comprises a cellular structure containing at least a proportion of discrete, closed cells. Suitable incompatible resins include polyamides and olefin polymers, particularly a homo- or co-polymer of a mono-alpha-olefin containing up to 6 carbon atoms in its molecule. Preferred materials include a low or high density olefin homopolymer, particularly polyethylene, polypropylene or poly-4-methylpentene-1, an olefin copolymer, particularly an ethylene-propylene copolymer, or a mixture of two or more thereof. Random, block or graft copolymers may be employed.

Particulate inorganic fillers include conventional inorganic fillers, and particularly metal or metalloid oxides, such as alumina, silica (especially precipitated or diatomaceous silica and silica gels) and titania, calcined china clay and alkaline metal salts, such as the carbonates and sulphates of calcium and barium. The particulate inorganic fillers may be of the voiding or non-voiding type. Suitable particulate inorganic fillers may be homogeneous and consist essentially of a single filler material or compound, such as titanium dioxide or barium sulphate alone. Alternatively, at least a proportion of the filler may be heterogeneous, the primary filler material being associated with an additional modifying component. For example, the primary filler particle may be treated with a surface modifier, such as a pigment, soap, surfactant coupling agent or other modifier to promote or alter the degree to which the filler is compatible with the polyester.

Preferred particulate inorganic, fillers include barium sulphate, titanium dioxide and silica, particularly barium sulphate arid titanium dioxide.

The barium sulphate particles may be derived directly from the natural ore (Barites) or by synthetic precipitation (Handbook of Fillers for Plastics, H S Katz, J V Milewski. Van Nostrand Publishers, New York (1987)), for example by the precipitation reaction between barium salts and sodium sulphate solutions. Synthetic $BaSO_4$ is generally of higher purity than that derived from the natural ore, which itself is usually >98.5%. The barium sulphate should be finely divided. Barites is commonly available with average diameter size of about 11 μm, 6 μm or 3 μm. The average diameter of synthetic $BaSO_4$ is usually lower, with values commonly about 3 μm, 1 μm or 0.7 μm.

Titanium dioxide particles may be of anatase or rutile crystal form. The titanium dioxide particles preferably comprise a major portion of rutile, more preferably at least 60% by weight, particularly at least 80%, and especially approximately 100% by weight of rutile. The particles can be prepared by standard procedures, such as the chloride process or the sulphate process. The titanium dioxide particles may be coated preferably with inorganic oxides such as aluminium, silicon, zinc, magnesium or mixtures thereof. Preferably the coating additionally comprises organic compound(s), such as fatty acids and preferably alkanols, suitably having from 8 to 30, preferably from 12 to 24 carbon atoms. Polydiorganosiloxanes or polyorganohydrogensiloxanes, such as polydimethylsiloxane or polymethylhydrogensiloxane are suitable organic compounds. The coating is suitably applied to the titanium dioxide particles in aqueous suspension. The inorganic oxides are precipitated in aqueous suspension from water-soluble compounds such as sodium aluminate, aluminium sulphate, aluminium hydroxide, aluminium nitrate, silicic acid or sodium silicate. The coating layer on the titanium dioxide particles is preferably in the range from 1 to 12% of inorganic oxides, and preferably in the range from 0.5 to 3% of organic compound, by weight based upon the weight of titanium dioxide.

The inorganic filler should be finely-divided, and the volume distributed median particle diameter (equivalent spherical diameter corresponding to 50% of the volume of all the particles, read on the cumulative distribution curve relating volume % to the diameter of the particles—often referred to as the "D(v,0.5)" value) thereof is preferably in the range from 0.01 to 5 μm, more preferably 0.05 to 5 μm, more preferably 0.05 to 1.5 μm, more preferably 0.15 to 1.2 μm, and particularly 0.15 to 0.5 μm.

Ideally, the largest particle should not have a size which is greater than the thickness of a filled layer. The presence of excessively large particles can result in the film exhibiting unsightly 'speckle', i.e. where the presence of individual filler particles in the film can be discerned with the naked eye. Particles exceeding such a size may be removed by sieving processes which are known in the art. In a preferred embodiment, particle size is controlled as a function of the size distribution of the inorganic filler particles. Preferably, the size distribution is such that the Standard Deviation does not exceed 4 times the D(v,0.5) value, preferably 3 times the D(v,0.5) value and most preferably 2 times the D(v,0.5) value. As an illustration, wherein the inorganic filler particles have a measured D(v,0.5) value of 0.5 μm then, on the basis that 99% of particles are within 3 standard deviations of the D(v,0.5) value, it is preferred that 99% of the filler particles do not exceed 6.5 μm (this figure being calculated as 0.5 μm+3×SD, where SD=4×0.5 μm), preferably that 99% of the filler particles do not exceed 5.0 μm (0.5 μm+3×SD, where SD=3×0.5 μm), and most preferably that 99% of the filler particles do not exceed 3.5 μm (0.5 μm+3×SD, where SD=2×0.5 μm).

Particle size of the filler particles may be measured by electron microscope, coulter counter, sedimentation analysis and static or dynamic light scattering. Techniques based on laser light diffraction are preferred. The median particle sire may be determined by plotting a cumulative distribution curve representing the percentage of particle volume below chosen particle sizes aid measuring the 50th percentile.

The layers of the polyester film may, if desired, also contain any of the other additives conventionally employed in the manufacture of polymeric films. Thus, agents such as dyes, pigments, voiding agents, lubricants, anti-oxidants, anti-blocking agents, surface active agents, slip aids, gloss improvers, prodegradants, flame retardants, ultra-violet light stabilisers, viscosity modifiers and dispersion stabilisers may be incorporated as appropriate.

In a preferred embodiment, at least one and preferably at least the outer layers of the multilayer film comprise one or more UV absorber(s). The UV absorber(s) may be any known to those skilled in the art which are compatible with the other materials used in the preparation of the multilayer films of the present invention.

In principle, any organic or inorganic UV absorber, particularly one which is suitable for use with polyester, may be employed in the present invention. Suitable examples include the organic UV absorbes disclosed in Encyclopaedia of Chemical Technology, Kirk-Othmer, Third Edition, John Wiley & Sons, Volume 23, Pages 615 to 627. Particular examples of UV absorbers include benzophenones, benzotriazoles (U.S. Pat. No. 4,684,679, U.S. Pat. No. 4,812,498 and U.S. Pat. No. 4,681,905), benzoxazinones (U.S. Pat. No. 4,446,262, U.S. Pat. No. 5,251,064 and U.S. Pat. No. 5,264,539) and triazines (U.S. Pat. No. 3,244,708, U.S. Pat. No. 3,843,371, U.S. Pat. No. 4,619,956, U.S. Pat. No.

5,288,778 and WO 94/05645). The teaching of the aforementioned documents is incorporated herein by reference. Preferably, the UV absorber is non-volatile and does not cause excessive yellowing of the product.

In one embodiment of the invention, a UV absorber may be chemically incorporated in the chain of a layer-forming polyester. Preferred UV-stable polyesters are produced by incorporating benzophenones into the polyester, for example as described in EP-A-0006686, EP-A-0031202, EP-A-0031203 and EP-A-0076582, the teaching of which is incorporated herein by reference.

In a preferred embodiment of the invention, the UV absorber comprises one or more triazines, more preferably hydroxyphenyltriazines, and particularly hydroxyphenyltriazine compounds of Formula 1:

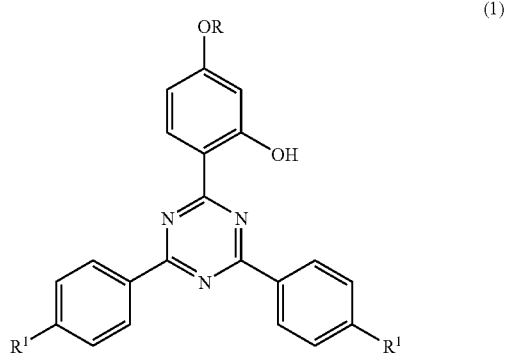

(1)

wherein R is hydrogen, $C_1$-$C_{18}$ alkyl, $C_2$-$C_6$ alkyl substituted by halogen or by $C_1$-$C_{12}$ alkoxy, or is benzyl and $R^1$ is hydrogen or methyl. R is preferably $C_1$-$C_{12}$ alkyl or benzyl, more preferably $C_3$-$C_6$ alkyl, and particularly hexyl. $R^1$ is preferably hydrogen. An especially preferred UV absorber is 2-(4,6-diphenyl-1,3,5-triazin-2-yl)-5-(hexyl)oxy-phenol, which is commercial available as Tinuvin™ 1577 FF from Ciba-Additives. Further examples of a preferred UV absorber are benzylidene malonate ester (commercially available as Sanduvor™ PR-25 from Sandoz), and benzoxazinone (commercially available as Cyasorb™ 3638 from Cytec).

Suitable inorganic UV absorbers include metal oxide particles, such as zinc oxide or titanium dioxide. Titanium dioxide particles, such as those previously described herein, are particularly preferred.

The amount of UV absorber incorporated into a layer is generally in the range from 0.1% to 10%, more preferably 0.5% to 9%, more preferably 1.2% to 8%, particularly 2% to 6%, and especially 3.2% to 5.5% by weight, relative to the weight of the polymer of that layer. In one embodiment of the invention, both an organic UV absorber, preferably a triazine, and an inorganic UV absorber, preferably titanium dioxide, are present. The ratio, by weight of inorganic to organic UV absorber is preferably in the range from 0.5 to 10:1, more preferably 1 to 5:1, and particularly 1.5 to 2.5:1.

The components of the composition of a layer may be mixed together in a conventional manner. For example, by mixing with the monomeric reactants from which the layer polymer is derive or the components may be mixed with the polymer by tumble or dry blending or by compounding in an extruder, followed by cooling and, usually, comminution into granules or chips. Masterbatching technology may also be employed.

The presence of the particulate filler generally also improves the windability of the film during manufacture. However, to increase windability, the film may also comprise a "slip coating". A suitable slip coating may be, for instance a discontinuous layer of an acrylic and/or methacrylic polymeric resin optionally further comprise a cross-linking agent, such as described in EP-A0408197, the disclosure of which is incorporated herein by reference. An alternative slip coating may comprise a potassium silicate coating, for instance as disclosed in U.S. Pat. Nos. 5,925,428 and 5,882,798, the disclosures of which are incorporated herein by reference.

The multilayer films may also comprise an ink-receptive coating. The ink-receptive coating improves the adhesion of ink to the film and increases the range of inks that can be readily applied to the surface. The ink-receptive coating may be any such coating well-known to those skilled in the art. For example, the ink-receptive coating may comprise an acrylic component and a cross-linking component (e.g. melamine formaldehyde), such as the coating disclosed in EP-A-0429179, the disclosure of which is incorporated herein be reference.

According to a further aspect of the invention there is provided a process for the manufacture of an opaque, tear-resistant film, said process comprising the steps of providing a plurality of layers of polymeric material, wherein said plurality of layers comprises at least two layers of filled polymeric material containing therein at least 5% by weight of opacifying agent and at least two layers of unfilled polyester material substantially devoid of opacifying agent, and forming a composite film of said plurality of layers.

According to a further aspect of the present invention, there is provided the use of two or more layers of unfilled polymeric material substantially devoid of opacifying agent to improve the tear-resistance of an opaque multilayer film comprising at least two filled layers of polymeric material wherein said filled layers comprise at least 5% by weight of opacifying agent.

According to a further aspect of the present invention, there is provided a method for improving the tear-resistance of an opaque multilayer polymeric film comprising at least two filled layers of polymeric material wherein said filled layers comprise at least 5% by weight of opacifying agent, said method comprising incorporating into the film at least two unfilled layers of polymeric material substantially devoid of opacifying agent.

The opaque polymeric films of the present invention have a wide variety of uses including use generally as a paper replacement (such as in films for graphics, displays, labels, cards (including identity cards, smart cards and credit cards) and imaging), as printing plate media, in packaging and in coil coating. The film would also be beneficial for laminating to the internal walls of a metal can, particularly a tin can. The films are especially useful in applications requiring thinner gauges of opaque tear-resistant film, particularly labels and packaging applications. As noted above, a thinner gauge can offer cost savings to price-sensitive markets and this is particularly important in packaging applications. The films are also especially useful in applications demanding a film product having a high tear-resistance.

The invention is illustrated by reference to the following figures in which:

FIG. 1 is a schematic illustration of a layer-multiplying arrangement as disclosed in U.S. Pat. No. 3,051,453 which was used to manufacture the multilayer films. The 3-layer melt stream enters the apparatus from the left hand side and exits the apparatus at the right hand side as shown in FIG.

1. Cross-sections of the melt stream are illustrated as inserts (a) to (e). The position of the dashed line A-A in insert (a) is shown in the schematic illustration of the apparatus. Similar sections are shown as B-B, C-C and D-D for inserts (b), (c) and (d) respectively. Thus, inserts (a) to (e) illustrate cross-sectional views of the structure of the multilayer, coextruded melt flow at various stages during the layer multiplying treatment. Referring to insert (a), a three layer composite melt stream, which is to be layer-multiplied, is present as shown before admission to the first multiplying device. The melt stream is then successively divided, compressed and recombined at stages (a), (b) and (c) respectively. A repeat treatment is illustrated, which yields a nine layer composite stream which is then transported to the die. A further repeat treatment would yield a structure comprising 17 layers.

Figure 2:
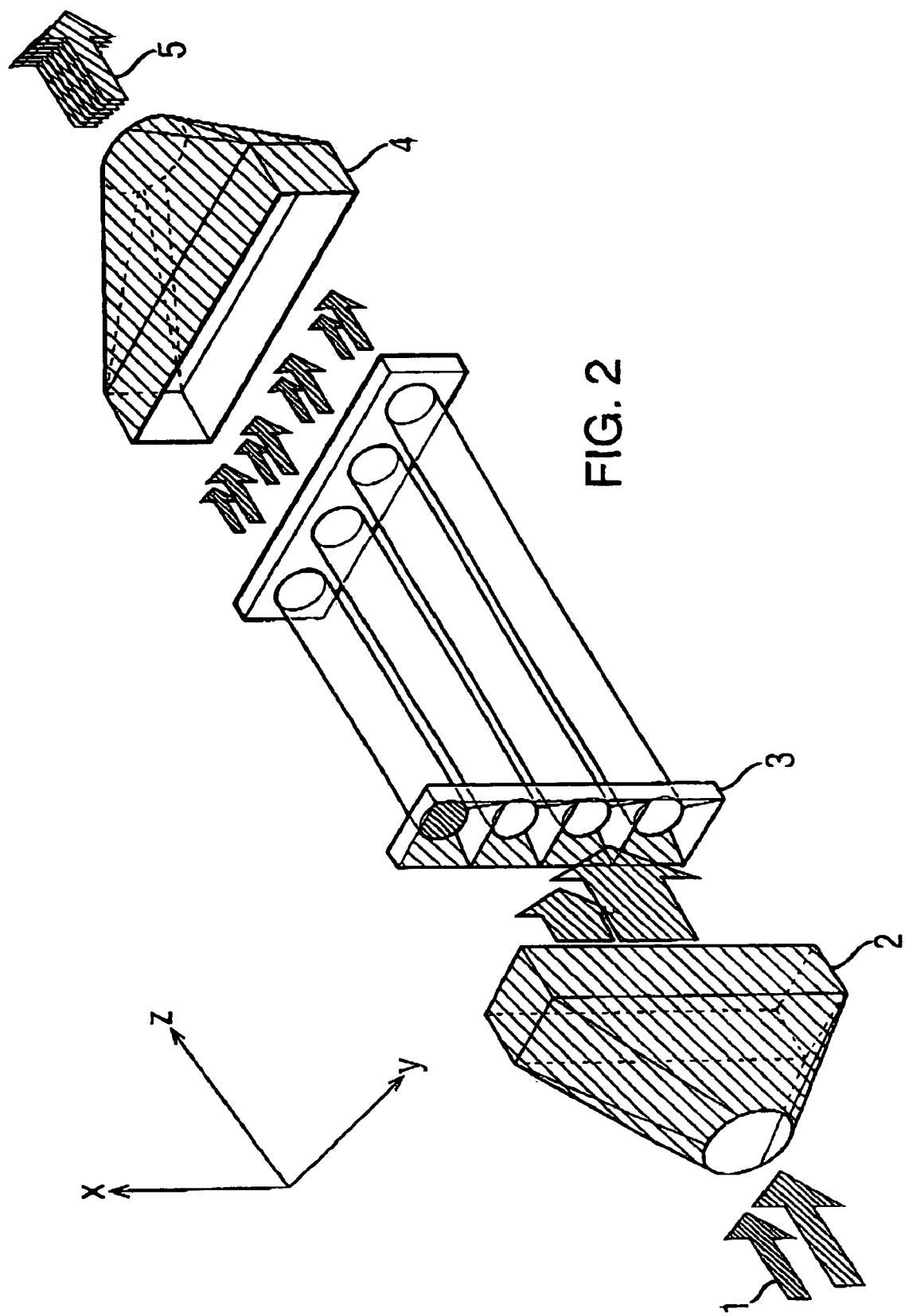

FIG. 2 is a schematic illustration of a layer-multiplying arrangement which may be used to manufacture the multilayer films.

Referring to FIG. 2, a two layer composite melt steam (1) is passed to a coextrusion block (2) and then passed through a four-lane layer multiplier (3). The polymeric material is then passed to the die (4) to provide an eight layer composite stream (5).

FIGS. 3B to 3D and FIGS. 4A to 4D are graphical representations of the test data obtained by analysing the films made as described in the following Examples. Further discussion of FIGS. 3B to 3D and 4A to 4D is provided below.

The following test methods may be used to determine certain properties of the film:
(i) Transmission Optical Density (TOD) of the film is measured in accordance with ASTM D1003-97 using a BYK Gardner Inc. Hazegard System in transmission mode.
(ii) $L^*$, $a^*$ and $b^*$ colour co-ordinate values (CIE (1976)) and whiteness index of the external surface of the white layer are measured using a Colorgard System 2000. Model/45 (manufactured by Pacific Scientific) based on the principles described in ASTM D313.
(iii) 60° gloss value of the film surface is measured using a Dr Lange Reflectometer REFO 3 (obtained from Dr Bruno Lange, GmbH, Dusseldorf, Germany) according to DIN 67530.
(iv) The maximum load and tear toughness of the film in both the machine and transverse directions were measured using the Graves Tear Test (ASTM D1004-94A) and as described herein.
(v) Tensile modulus and tensile elongation may be measured in accordance with ASTM D882-88.

The invention is further illustrated by reference to the following examples.

EXAMPLES

The films were manufactured using a standard flat film extrusion and stenter process with the following materials:
Polymer "A": Poly(ethylene terephthalate) (PET) having an intrinsic viscosity (IV) of 0.63+/−0.02
Polymer "B": PET containing 20 w/w % barium sulphate filler having an IV of 0.63+/−0.02
Blend 1: 100% Polymer B
Blend 2: 80% Polymer B; 20% Polymer A
Blend 3: 70% Polymer B; 30% Polymer A
Blend 4: 60% Polymer B; 40% Polymer A
Blend 5: 50% Polymer B; 50% Polymer A Polymers A and B were used to make the unfilled and filled layers of a multilayer film, respectively. Blends 1 to 5 were used to make monolayer films prepared for the purposes of comparison with the multilayer films.

A melt coextrusion system was used in which two separate extruders supplied polymer in the molten state through a coextrusion injector block to a common melt channel. The feature of the injection block is that the two polymer melt flows are introduced to, and remain discrete layers in, a common melt pipe.

The coextruding melt was passed through a system capable of splitting and recombining the flow such that the number of discrete layers of polymer melt was increased within the melt channel. The method to produce multiple layers of polymer from an initial flow consisting of 3 layers was similar to techniques described in U.S. Pat. No. 3,051,453, discussed above. Where identical polymer was fed by each extruder into the melt system for the purpose of providing Comparative Examples, a single or monolayer of polymer was processed.

The molten polymer was subsequently extruded through a flat film die, and cast as a melt curtain onto a cold, rotating chill roll. Thereafter the cast film was subjected to several further stages of processing. The film was fed through a stretching stage, where a draw ratio between 2.9 and 3.1 in the forward or machine direction at 90° C. was imposed on the material. A sideways or transverse draw of ratio 3.2 was then applied by a tentering method at a temperature of 110° C., and finally the biaxially-oriented film was crystallised in a heat-set stage at temperatures around 220° C.

Table 1 shows the process conditions of film manufacture and the properties of the films produced. In order to assess the characteristics of the multilayer films of the invention, a series of monolayer films of corresponding thickness was also prepared for comparison purposes. The data for the optical density and maximum load have been normalised to an 80 μm film.

Figure 3C:
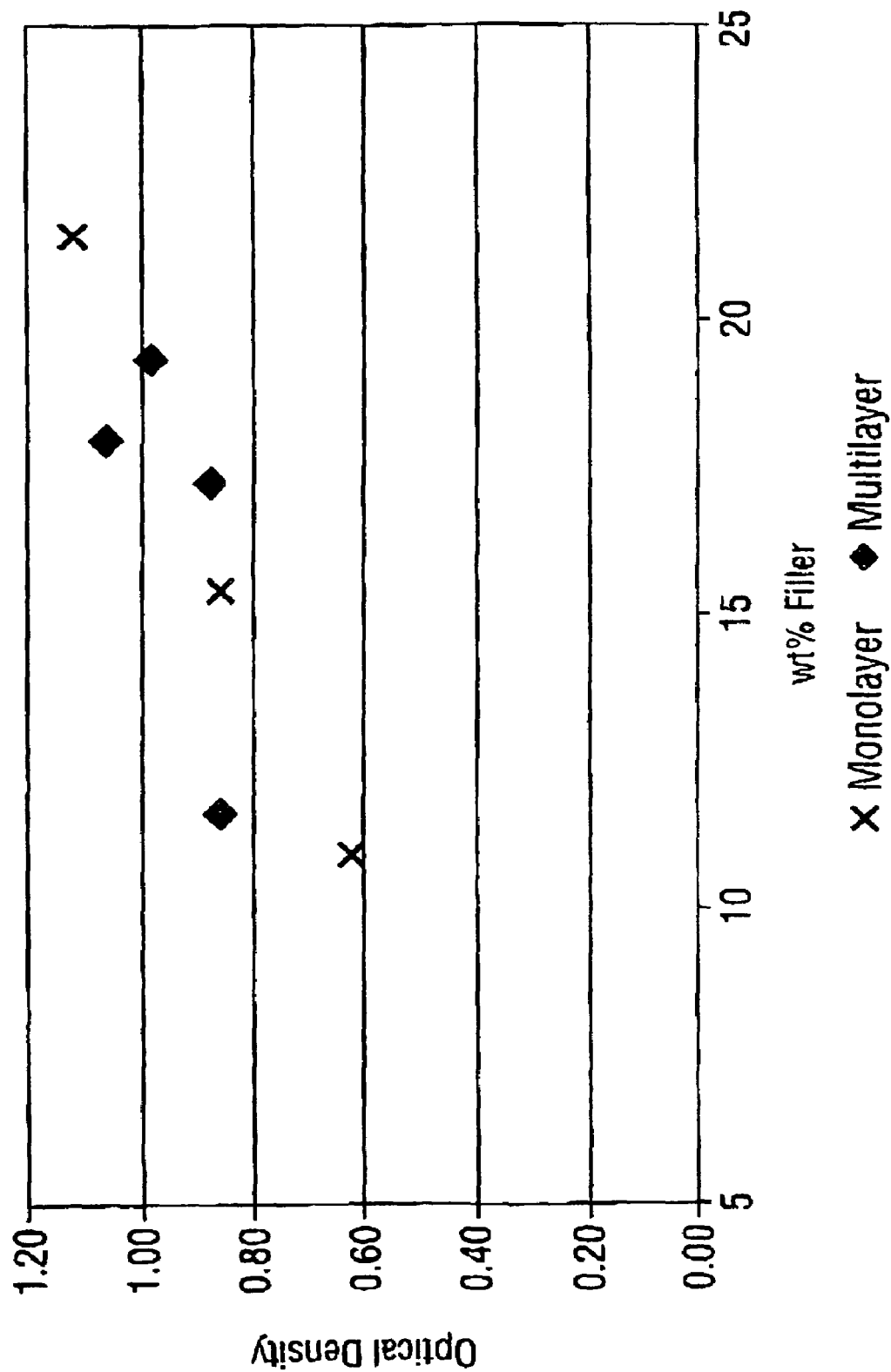

The data for optical density and tear-resistance shown in Table 1 are also represented in FIGS. 3B to 3D and in FIG. 4A to 4D. In FIGS. 3B to 3D the optical density is plotted as a function of filler concentration. In FIGS. 4A to 4D the tear-toughness is plotted as a function of filler concentration.

Figure 4A:
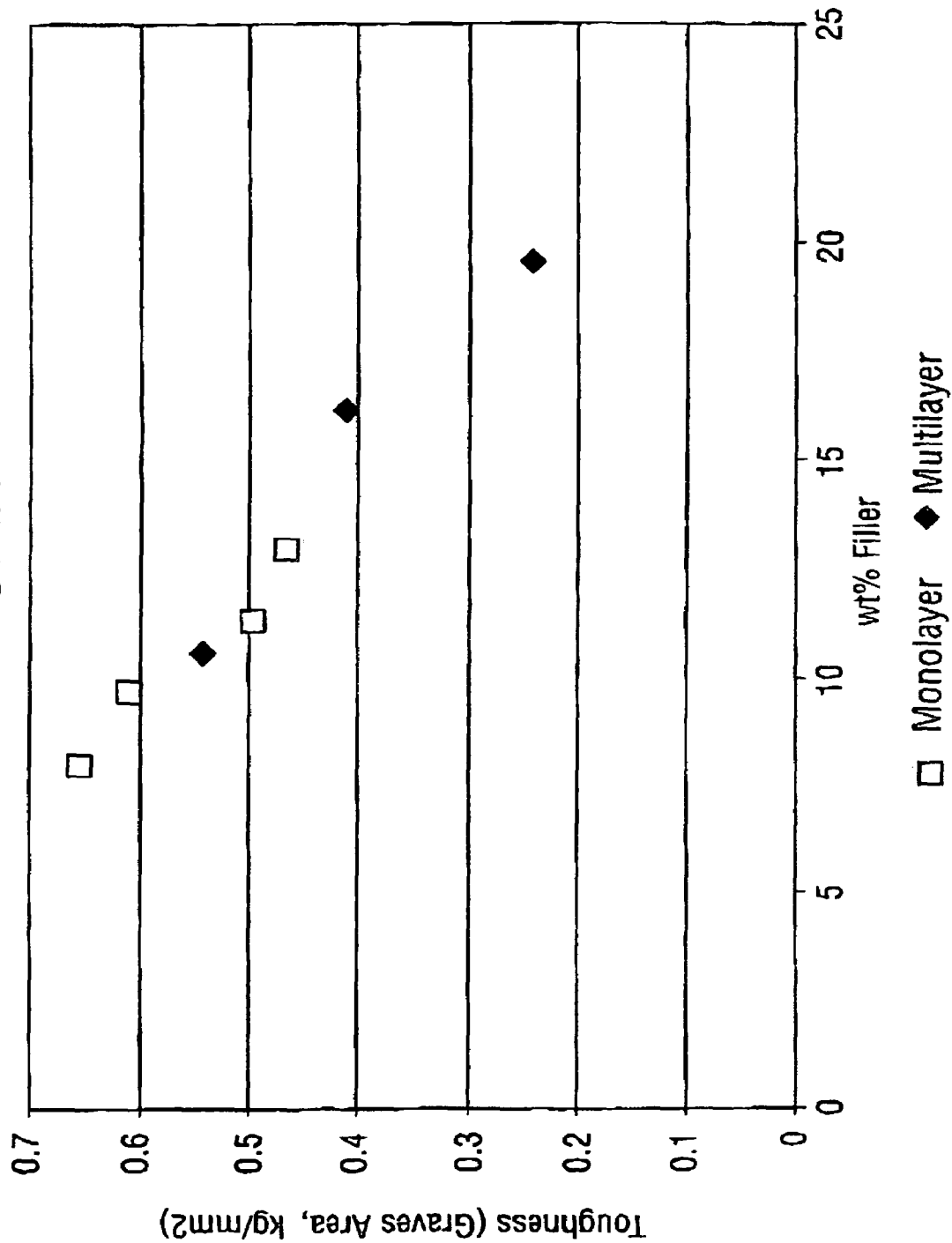
Figure 4B:
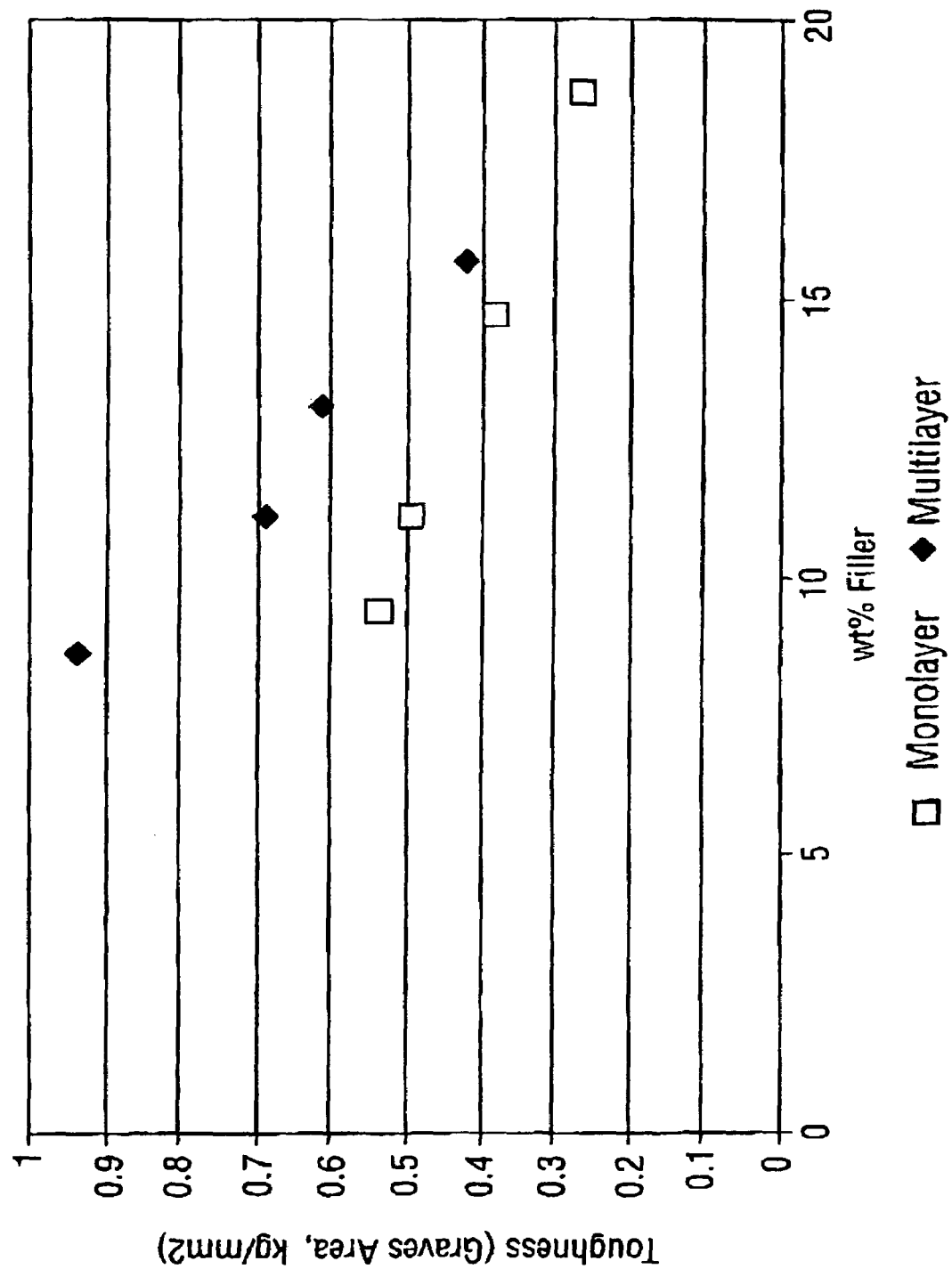

FIG. 4A displays the tear toughness data for the multilayer films of Comparative Examples 1 to 4 and the data for the monolayer Comparative Examples 5 to 7. FIGS. 3B and 4B display the opacity and tear toughness data for Examples 1 to 5 (9 layers) and monolayer Comparative Examples 8 to 11.

FIGS. 3C and 4C display the opacity and tear toughness data for Examples 6 to 9 (17 layers) and monolayer Comparative Examples 12 to 14.

Figure 4D:
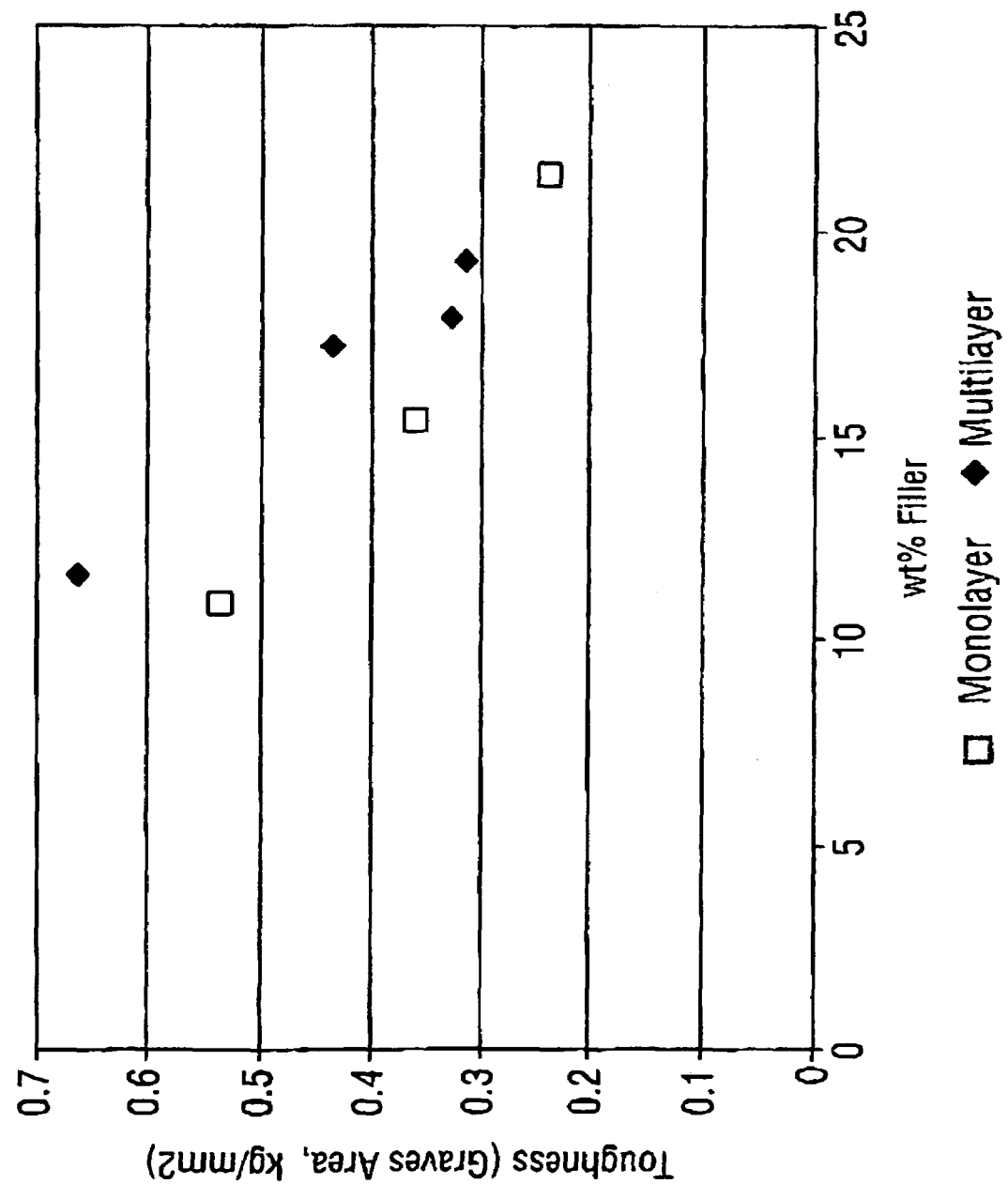

FIGS. 3D and 4D display the opacity and tear toughness data for Examples 10 to 13 (17 layers) and monolayer Comparative Examples 15 to 17.

FIGS. 3B to 3D demonstrate that for a given loading of filler, a multilayer film according to the invention exhibits improved optical density in relation to a monolayer film having the corresponding loading of filler.

FIGS. 4B to 4D demonstrate that for a given loading of filler, a multilayer film according to the invention unexpectedly exhibits a greater tear toughness in relation to a monolayer film having the corresponding loading of filler. FIG. 4A demonstrates that this effect is not shown for a three layer film, which performs in a similar manner to the monolayer film.

Other advantages of the films of the present invention are apparent by further analysis of this data.

It is clear from FIG. 3B that in order to match the opacity of the most highly filled mono-layer film, a multilayer film must exhibit an optical density of about 1.02. The filler loading required to achieve this in a monolayer film is around 19%, whereas for a multilayer film according to the invention this optical density can be achieved using only about 16% filler.

Thus, for a given optical density, the multilayer films of the present invention are more economical to produce than the monolayer films of the prior art.

Moreover, when one compares the tear toughness of these two films having matching opacity (see FIG. 4B), the multilayer film (approximately 16% filler) exhibits a tear toughness of approximately 0.42 kg/mm$^2$, which is almost double that of the equivalent-opacity monolayer film (approximately 19% filler) which has a tear toughness of 0.26 kg/mm$^2$.

3. A film according to claim 1 wherein the polymeric material of the layers substantially devoid of opacifying agent is the same as that of the polymeric material of the layers comprising at least 5% by weight of opacifying agent.

4. A film according to claim 1 wherein the polymeric material of a layer is poly(ethylene terephthalate).

5. A film according to claim 1 wherein said opacifying agent is an inorganic particulate filler.

6. A film according to claim 1 wherein said opacifying agent is barium sulphate.

7. A film according to claim 1 wherein said filled layers comprise opacifying agent in the range of from 10 to 30% by weight of the polymeric material of the filled layer.

8. A film according to claim 1 having a multilayer structure $(BA)_nB$ wherein A represents an unfilled layer, B represents a filled layer and n is at least 2.

9. A film according to claim 8 wherein n is at least 3.

TABLE 1

| Film | No. of layers | Film structure and Composition | Feed Rate* Stream 1 Kg/hr | Feed Rate* Stream 2 kg/hr | Draw Ratio (FD × SD) | Film thickness (μm) | Total filler (%) | Optical Density (normalised) | Graves Tear Test Max Load (kgf) MD | Max Load (kgf) TD | Tear-Toughness (kg/mm$^2$) MD | Tear-Toughness (kg/mm$^2$) TD |
|---|---|---|---|---|---|---|---|---|---|---|---|---|
| C. Ex 1 | 3 | BAB | 93 | 40 | 2.9 × 3.2 | 81 | 12.9 | — | 3.52 | — | 0.466 | — |
| C. Ex 2 | 3 | BAB | 72 | 48 | 2.9 × 3.2 | 76 | 11.3 | — | 3.78 | — | 0.497 | — |
| C. Ex 3 | 3 | BAB | 60 | 60 | 2.9 × 3.2 | 86 | 9.6 | — | 3.85 | — | 0.611 | — |
| C. Ex 4 | 3 | BAB | 50 | 75 | 2.9 × 3.2 | 92 | 7.9 | — | 3.99 | — | 0.657 | — |
| C. Ex 5 | 1 | Mono; Blend 5 | 72 | 48 | 2.9 × 3.2 | 61 | 10.5 | — | 3.94 | — | 0.542 | — |
| C. Ex 6 | 1 | Mono; Blend 2 | 72 | 48 | 2.9 × 3.2 | 90 | 16.2 | — | 3.76 | — | 0.411 | — |
| C. Ex 7 | 1 | Mono; Blend 1 | 72 | 48 | 2.9 × 3.2 | 76 | 19.6 | — | 3.11 | — | 0.24 | — |
| Ex. 1 | 9 | $(BA)_4B$ | 149 | 40 | 3.1 × 3.2 | 79.9 | 16.1 | 1.05 | — | — | — | — |
| Ex. 2 | 9 | $(BA)_4B$ | 93 | 40 | 3.1 × 3.2 | 75.7 | 15.7 | 0.95 | 3.602 | — | 0.418 | — |
| Ex. 3 | 9 | $(BA)_4B$ | 71 | 48 | 3.1 × 3.2 | 78.8 | 13.1 | 0.85 | 4.019 | — | 0.615 | — |
| Ex. 4 | 9 | $(BA)_4B$ | 59 | 60 | 3.1 × 3.2 | 85.5 | 11.1 | 0.76 | 3.873 | — | 0.687 | — |
| Ex. 5 | 9 | $(BA)_4B$ | 50 | 75 | 3.1 × 3.2 | 75.1 | 8.6 | 0.75 | 3.937 | — | 0.937 | — |
| C. Ex. 8 | 1 | Mono; Blend 5 | 72 | 48 | 3.1 × 3.2 | 76.9 | 9.4 | 0.55 | 3.661 | — | 0.536 | — |
| C. Ex. 9 | 1 | Mono: Blend 4 | 72 | 48 | 3.1 × 3.2 | 75.4 | 11.1 | 0.65 | 3.522 | — | 0.494 | — |
| C. Ex. 10 | 1 | Mono; Blend 2 | 72 | 48 | 3.1 × 3.2 | 81.1 | 14.7 | 0.71 | 3.399 | — | 0.382 | — |
| C. Ex. 11 | 1 | Mono; Blend 1 | 72 | 48 | 3.1 × 3.2 | 81.1 | 18.7 | 1.02 | 3.264 | — | 0.262 | — |
| Ex. 6 | 17 | $(BA)_8B$ | 109 | 50 | 3.1 × 3.2 | 95.33 | 19.3 | 0.99 | 3.022 | 2.769 | 0.257 | 0.291 |
| Ex. 7 | 17 | $(BA)_8B$ | 90 | 56 | 3.1 × 3.2 | 81.3 | 17.9 | 1.07 | 3.354 | 3.091 | 0.294 | 0.321 |
| Ex. 8 | 17 | $(BA)_8B$ | 80 | 60 | 3.1 × 3.2 | 100.8 | 17.2 | 0.88 | 2.935 | 2.743 | 0.353 | 0.35 |
| Ex. 9 | 17 | $(BA)_8B$ | 70 | 65 | 3.1 × 3.2 | 83.7 | 11.6 | 0.86 | 3.329 | 3.122 | 0.508 | 0.401 |
| C. Ex. 12 | 1 | Mono: Blend 5 | 72 | 48 | 3.1 × 3.2 | 79.7 | 10.9 | 0.62 | 3.537 | 3.459 | 0.344 | 0.377 |
| C. Ex. 13 | 1 | Mono: Blend 3 | 72 | 48 | 3.1 × 3.2 | 87.8 | 15.4 | 0.86 | 3.248 | 2.837 | 0.244 | 0.25 |
| C. Ex. 14 | 1 | Mono; Blend 1 | 72 | 48 | 3.1 × 3.2 | 81.3 | 21.4 | 1.13 | 2.872 | 2.517 | 0.177 | 0.179 |
| Ex. 10 | 17 | $(BA)_8B$ | 109 | 50 | 2.9 × 3.2 | 93.2 | 19.3 | 0.90 | 3.588 | 3.285 | 0.311 | 0.329 |
| Ex. 11 | 17 | $(BA)_8B$ | 90 | 56 | 2.9 × 3.2 | 83.7 | 17.9 | 0.96 | 3.558 | 3.294 | 0.327 | 0.339 |
| Ex. 12 | 17 | $(BA_(8B$ | 80 | 60 | 2.9 × 3.2 | 107.1 | 17.2 | 0.77 | 3.838 | 3.273 | 0.435 | 0.402 |
| Ex. 13 | 17 | $(BA)_8B$ | 70 | 65 | 2.9 × 3.2 | 87.8 | 11.6 | 0.77 | 3.688 | 3.366 | 0.662 | 0.57 |
| C. Ex 15 | 1 | Mono; Blend 5 | 72 | 48 | 2.9 × 3.2 | 81.9 | 10.9 | 0.49 | 4.053 | 3.535 | 0.538 | 0.419 |
| C. Ex 16 | 1 | Mono; Blend 3 | 72 | 48 | 2.9 × 3.2 | 86.5 | 15.4 | 0.74 | 3.794 | 3.413 | 0.36 | 0.296 |
| C. Ex 17 | 1 | Mono; Blend 1 | 72 | 48 | 2.9 × 3.2 | 76.2 | 21.4 | 1.07 | 3.521 | 3.205 | 0.237 | 0.208 |

*Stream 1 and Stream 2 carry polymers A and B, resepctively. Where a mono-layer film is produced, Streams 1 and 2 carry the same polymer.

The invention claimed is:

1. An opaque multilayer film having a tear toughness in at least one dimension of the film of at least 0.3 kg/mm$^2$ measured as the area beneath the curve in a graphical plot of stress versus strain in accordance with ASTM D1004-94A, and comprising at least two unfilled polyester layers substantially devoid of opacifying agent and at least two filled layers of polymeric material wherein said filled layers comprise at least 5% by weight of opacifying agent, wherein the filled and unfilled layers alternate.

2. A film according to claim 1, wherein the polymeric material of said filled layers is polyester.

10. A film according to claim 1 wherein the total number of layers is 7 or more.

11. A film according to claim 1 having a transmission optical density of at least 0.5.

12. A process for the manufacture of an opaque, tear-resistant film having a tear toughness in at least one dimension of the film of at least 0.3 kg/mm$^2$ measured as the area beneath the curve in a graphical plot of stress versus strain in accordance with ASTM D1004-94A, said process comprising the steps of providing a plurality of layers of polymeric material, wherein said plurality of layers comprises at least two layers of filled polymeric material containing therein at least 5% by weight of opacifying agent and at least two layers of unfilled polyester material substantially devoid of opacifying agent, and forming a composite film of said plurality of layers wherein the filled and unfilled layers alternate.

13. A method of using a multilayer film structure comprising at least two unfilled layers of polymeric material substantially devoid of opacifying agent and at least two filled layers of polymeric material wherein said filled layers comprise at least 5% by weight of opacifying agent for providing improved tear-resistance in an opaque polymeric film such that said film has a tear toughness in at least one dimension of the film of at least 0.3 kg/mm$^2$ measured as the area beneath the curve in a graphical plot of stress versus strain in accordance with ASTM D1004-94A.

14. A method for improving the tear-resistance of an opaque multilayer polymeric film comprising at least two filled layers of polymeric material wherein said filled layers comprise at least 5% by weight of opacifying agent, said method comprising incorporating into the film at least two unfilled layers of polymeric material substantially devoid of opacifying agent, such that said film has a tear toughness in at least one dimension of the film of at least 0.3 kg/mm$^2$ measured as the area beneath the curve in a graphical plot of stress versus strain in accordance with ASTM D1004-94A.

15. A method of using two or more layers of unfilled polymeric material substantially devoid of opacifying agent to improve the tear-resistance of an opaque multilayer film comprising at least two filled layers of polymeric material wherein said filled layers comprise at least 5% by weight of opacifying agent, such that said film has a tear toughness in at least one dimension of the film of at least 0.3 kg/mm$^2$ measured as the area beneath the curve in a graphical plot of stress versus strain in accordance with ASTM D1004-94A.

* * * * *